US012601138B2

(12) United States Patent
Tada et al.

(10) Patent No.: US 12,601,138 B2
(45) Date of Patent: Apr. 14, 2026

(54) POWER TOOL HAVING A HAMMER MECHANISM

(71) Applicant: MAKITA CORPORATION, Anjo (JP)

(72) Inventors: Yoshiro Tada, Anjo (JP); Masanori Furusawa, Anjo (JP); Kei Watanabe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/003,038

(22) Filed: Dec. 27, 2024

(65) Prior Publication Data

US 2025/0230624 A1 Jul. 17, 2025

(30) Foreign Application Priority Data

Jan. 15, 2024 (JP) ................................. 2024-003944

(51) Int. Cl.
| | |
|---|---|
| *E02F 3/02* | (2006.01) |
| *A01B 1/02* | (2006.01) |
| *B25D 11/06* | (2006.01) |
| *B25D 17/04* | (2006.01) |

(52) U.S. Cl.
CPC .................. *E02F 3/02* (2013.01); *A01B 1/02* (2013.01); *B25D 11/068* (2013.01); *B25D 17/04* (2013.01); *B25D 2250/095* (2013.01); *B25D 2250/375* (2013.01)

(58) Field of Classification Search
CPC ........ A01B 1/02; B25D 11/068; B25D 17/04; B25D 2250/095; B25D 2250/375; E02F 3/02
See application file for complete search history.

(56) References Cited

U.S. PATENT DOCUMENTS

| | | | | |
|---|---|---|---|---|
| 3,924,691 | A * | 12/1975 | Brannstrom | .............. E21B 1/34 173/48 |
| 3,939,921 | A * | 2/1976 | Brannstrom | .............. E21B 1/38 173/121 |
| 4,609,053 | A * | 9/1986 | Ragnmark | ............. B25D 17/24 173/104 |
| 5,002,134 | A | 3/1991 | Yamada | |
| 5,588,496 | A * | 12/1996 | Elger | .................. B25B 23/1405 192/56.1 |
| 6,192,996 | B1 * | 2/2001 | Sakaguchi | ........... B25D 16/006 173/48 |

(Continued)

FOREIGN PATENT DOCUMENTS

DE 102018210189 A1 * 12/2019 ........... B25D 11/125

*Primary Examiner* — Stephen F. Gerrity
*Assistant Examiner* — David G Shutty
(74) *Attorney, Agent, or Firm* — Oliff PLC

(57) ABSTRACT

A power tool includes a motor, a hammer mechanism, and a housing. The motor has a motor shaft that rotates around a motor axis. The hammer mechanism includes a cylinder and a hammer element adjacent to an air chamber defined within the cylinder and is configured to convert rotary motion of the motor shaft to linear motion of the hammer element along a prescribed hammer axis by utilizing action of an air spring of the air chamber. The housing houses the motor and the hammer mechanism. The motor axis is arranged to be parallel to the hammer axis and to pass through the inside of the cylinder.

12 Claims, 5 Drawing Sheets

(56) References Cited

U.S. PATENT DOCUMENTS

| | | | | |
|---|---|---|---|---|
| 6,918,450 | B2 * | 7/2005 | Lebisch | B25D 16/006 |
| | | | | 173/104 |
| 8,621,719 | B2 * | 1/2014 | Nakashima | B25F 5/026 |
| | | | | 16/422 |
| 8,684,105 | B2 * | 4/2014 | Yoshikane | B25F 5/001 |
| | | | | 192/54.5 |
| 9,010,456 | B2 * | 4/2015 | Sieber | B25D 16/006 |
| | | | | 173/48 |
| 9,943,940 | B2 * | 4/2018 | Furusawa | B23Q 11/0046 |
| 9,962,823 | B2 * | 5/2018 | Machida | B25F 5/006 |
| 10,500,706 | B2 * | 12/2019 | Takeuchi | B25D 11/062 |
| 2009/0308626 | A1 * | 12/2009 | Saur | B25D 16/006 |
| | | | | 173/160 |
| 2010/0064482 | A1 * | 3/2010 | Martin | B25F 5/026 |
| | | | | 16/426 |
| 2015/0298309 | A1 * | 10/2015 | Berdin | B25D 9/10 |
| | | | | 173/104 |
| 2016/0346911 | A1 * | 12/2016 | Blum | B25D 9/06 |
| 2017/0106517 | A1 * | 4/2017 | Machida | B25D 11/102 |
| 2021/0107120 | A1 * | 4/2021 | Seith | B25F 5/02 |
| 2022/0371172 | A1 * | 11/2022 | Thorson | B25D 11/04 |
| 2024/0391077 | A1 * | 11/2024 | Yoshikane | B25F 5/001 |
| 2025/0230624 | A1 * | 7/2025 | Tada | A01B 1/02 |

* cited by examiner

POWER TOOL HAVING A HAMMER MECHANISM

CROSS-REFERENCE TO RELATED APPLICATION

This application claims priority to Japanese patent application no. 2024-3944 filed on Jan. 15, 2024, the contents of which are fully incorporated herein by reference.

TECHNICAL FIELD

The present disclosure relates to a power tool having a hammer mechanism.

BACKGROUND

U.S. Pat. No. 5,002,134, for example, discloses a power tool having a hammer mechanism. The power tool includes a support shaft that is rotated by the driving force of a motor, a rotary body that is rotated by rotation of the support shaft, an impact member that is mounted onto the rotary body, and a shovel as a tool accessory. In this power tool, rotary motion of the motor is converted into linear motion of the shovel by utilizing a cam mechanism that is rotated by the driving force of the motor.

SUMMARY

In such a prior art, however, the driving force of the motor is mechanically converted into reciprocating motion of the tool accessory. Therefore, vibration of the power tool may be increased, and a sufficient hammering force of the tool accessory may not be obtained.

One non-limiting aspect of the present disclosure herein provides a power tool that includes a motor, a hammer mechanism and a housing. The motor has a motor shaft that rotates around a motor axis. The hammer mechanism includes a hammer element adjacent to an air chamber defined within the cylinder and is configured to convert rotary motion of the motor shaft to linear motion of the hammer element along a prescribed hammer axis by utilizing action of an air spring of the air chamber. The housing houses the motor and the hammer mechanism. The motor axis is arranged to be parallel to the hammer axis and to pass through the inside of the cylinder.

In the power tool according to the above-described aspect, by provision of the hammer mechanism utilizing an air spring, compared with a hammer mechanism that mechanically transmits the kinetic energy, vibration of the power tool is reduced and large kinetic energy is transmitted to the tool accessory. Further, the motor axis is arranged close to the hammer axis, and components from the motor to the tool accessory are arranged substantially on a straight line, so that a user can easily apply a linear force to the tool accessory. Therefore, the power tool is provided that is suitable for digging work.

DETAILED DESCRIPTION OF THE EMBODIMENTS

Figure 1:
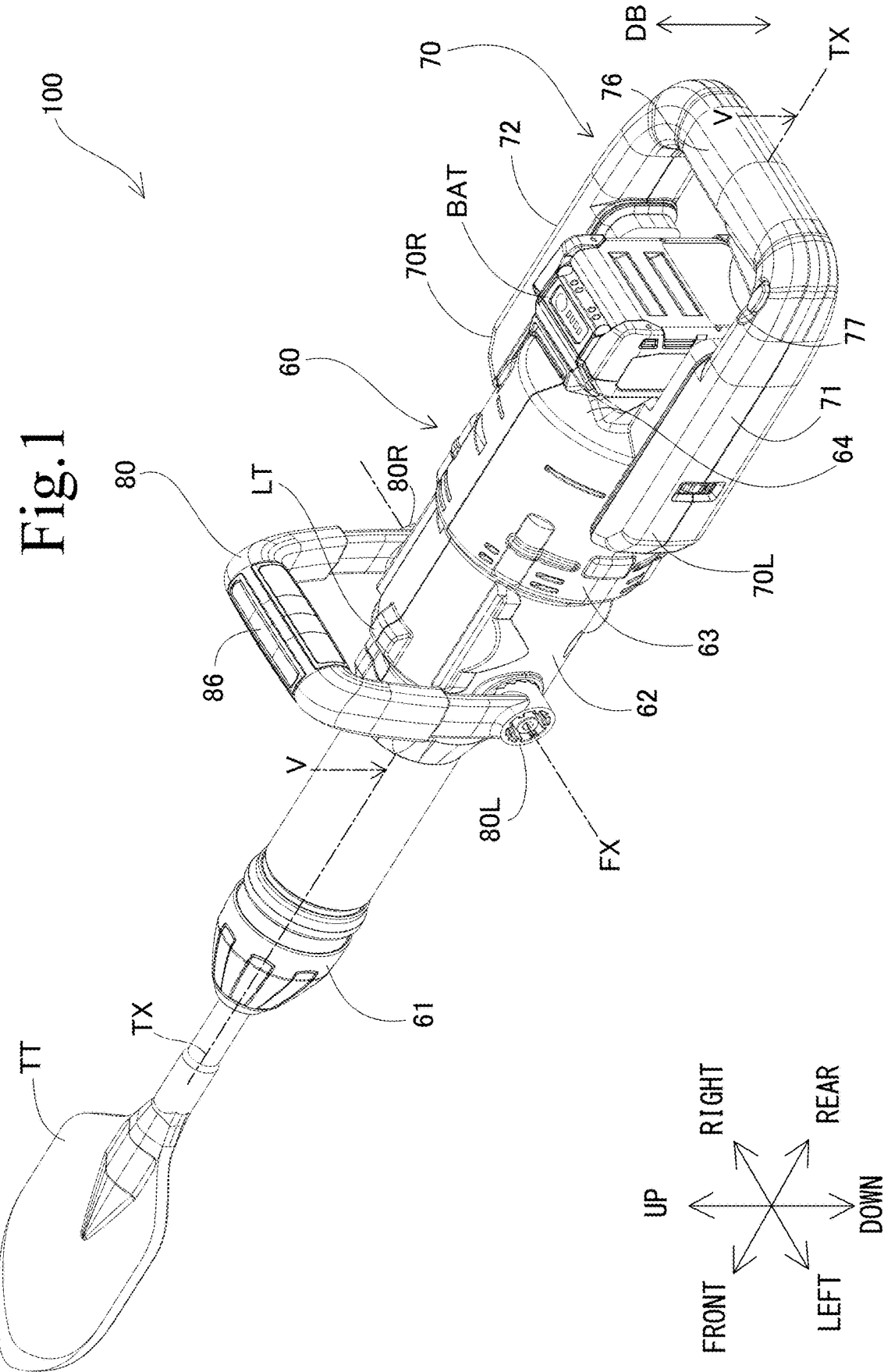
FIG. 1 shows an external appearance of a power tool having a hammer mechanism according to a first embodiment of the present disclosure.

Representative, non-limiting examples of the present invention are described in detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved tools and manufacturing and using methods of the tools.

Moreover, combinations of features and steps disclosed within the following detailed description may not be necessary to practice the invention in the broadest sense, and are instead taught merely to particularly describe representative examples of the invention. Furthermore, various features of the representative examples described above and below, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In addition or in the alternative to the preceding embodiments, the power tool may further have a main handle. The main handle includes (i) a grip part configured to be held by a user, (ii) a first connection part that connects a first end of the grip part to the housing, and (iii) a second connection part that connects a second end of the grip part to the housing. The hammer axis may pass through between the first end and the second end of the grip part when the power tool is viewed in a direction orthogonal to the hammer axis.

With the power tool according to this embodiment, a user can easily push the power tool forward along the hammer axis by operating the main handle, so that the power tool is provided that is suitable for digging work.

In addition or in the alternative to the preceding embodiments, the hammer mechanism may further include (i) a second bevel gear that is engaged with a first bevel gear provided on the motor shaft, and (ii) a crank shaft that is integrally formed with the second bevel gear and rotates together with the second bevel gear.

In the power tool according to this embodiment, the driving force of the motor is efficiently transmitted.

In addition or in the alternative to the preceding embodiments, an extending direction of the grip part may be (i) parallel to a plane orthogonal to a rotational axis of the second bevel gear and (ii) cross the hammer axis.

According to this embodiment, the power tool is provided that has a good weight balance when the main handle is held by a user.

In addition or in the alternative to the preceding embodiments, the power tool may have a controller. The controller may control the motor. The main handle may be connected to a rear end part of the housing. The controller may be (i) housed in the housing and (ii) arranged between the motor and the grip part in an extending direction of the hammer axis.

In the power tool according to this embodiment, the controller is efficiently arranged within the housing.

In addition or in the alternative to the preceding embodiments, the housing may further include a battery mounting part to which a battery for supplying power to the motor is removably attachable. The hammer axis may be arranged to pass through at least part of the battery mounting part.

In the power tool according to this embodiment, with the arrangement of the battery on the hammer axis, the size increase of the housing in a direction crossing the hammer axis is reduced or prevented.

In addition or in the alternative to the preceding embodiments, the battery mounting part may be arranged between the first connection part and the second connection part on the housing in an extending direction of the grip part.

In the power tool according to this embodiment, the battery is surrounded by the main handle, so that the battery is protected by utilizing the main handle.

In addition or in the alternative to the preceding embodiments, the housing may include an inner housing. The inner housing may house the motor and the hammer mechanism. An outer housing may house the inner housing. The main handle may be connected. An elastic element may be arranged in contact with the inner housing and the outer housing between the inner housing and the outer housing.

In the power tool according to this embodiment, transmission of vibration from the inner housing, which houses a vibration source(s), to the outer housing is reduced or prevented during driving of the power tool.

In addition or in the alternative to the preceding embodiments, the power tool having a hammer mechanism may further have a front handle. The front handle may be configured to be held by a user. When an extending direction of the hammer axis may define a front-rear direction of the power tool. The main handle may be connected rearward of the rotational axis of the second bevel gear on the housing. The front handle may be connected forward of the rotational axis of the second bevel gear on the housing.

With the power tool according to this embodiment, a user can easily transmit to the power tool a force of pressing the tool accessory against a work object by using the main handle and the front handle. Thus, the power tool is provided that is suitable for digging work.

In addition or in the alternative to the preceding embodiments, the power tool having a hammer mechanism may further have a light emitting part. The light emitting part may be configured to emit light toward a working area.

With the power tool according to this embodiment, the visibility of the working area of the power tool is improved by providing the light emitting part.

A. First Embodiment

A power tool 100 having a hammer mechanism (hereinafter simply referred to as the power tool 100) according to the first embodiment of the present disclosure is now described with reference to the drawings. In this embodiment, an electric shovel is described as a representative example of the power tool 100. The electric shovel is a hand-held power tool configured to be used for digging, shoveling, scooping, or crushing soil, sand, gravel, coal, snow or the like, or other similar work. The electric shovel is configured to linearly reciprocate a shovel as a tool accessory TT mounted to a front end of a housing 60, along a hammer axis TX (which motion is hereinafter also referred to as hammering motion) by utilizing the driving force of the motor. The shovel is intended, for example, for use in civil engineering or agriculture or for domestic use. The shovel is also referred to as a scoop. The power tool 100 can also be appropriately used for other than digging work by replacing the tool accessory TT.

In this specification, for the sake of convenience of description, the extending direction of the hammer axis TX is defined as a front-rear direction of the power tool 100. In the front-rear direction, a front end part 61 side of the housing 60 on which a tool holder 90 (see FIG. 3) is arranged is defined as the front side of the power tool 100, and the opposite side is defined as the rear side of the power tool 100. A direction parallel to a rotational axis CX (see FIG. 3) of a crank shaft 564 (described below) is defined as an up-down direction of the power tool 100. In the up-down direction, the direction from the crank shaft 564 toward the hammer axis TX is defined as an upward direction, and the opposite direction is defined as a downward direction. A direction orthogonal to the front-rear direction and the up-down direction is defined as a left-right direction.

The power tool 100 has a housing 60, and a motor 20 (see FIG. 3) and a hammer mechanism 50 (see FIG. 3) that are housed in the housing 60. As shown in FIG. 1, the housing 60 is an elongate hollow casing having a generally circular cylindrical shape and extending along the hammer axis TX. The housing 60 includes a front end part 61 on the front side of the housing 60, a hammer mechanism housing part 62, a motor housing part 63, and a rear end part 64 on the opposite side to the front end part 61.

A main handle 70 is connected to the rear end part 64 of the housing 60, and a front handle 80 is connected to the hammer mechanism housing part 62. The main handle 70 is generally U-shaped, and has a grip part 76 configured to be held by a user, a first extension part 71, a second extension part 72, a first connection part 70L and a second connection part 70R. The main handle 70 is fixed at both ends to the housing 60 via the first connection part 70L and the second connection part 70R. Thus, the main handle 70 and the housing 60 together form an annular (loop-like) configuration as viewed from above.

Figure 3:
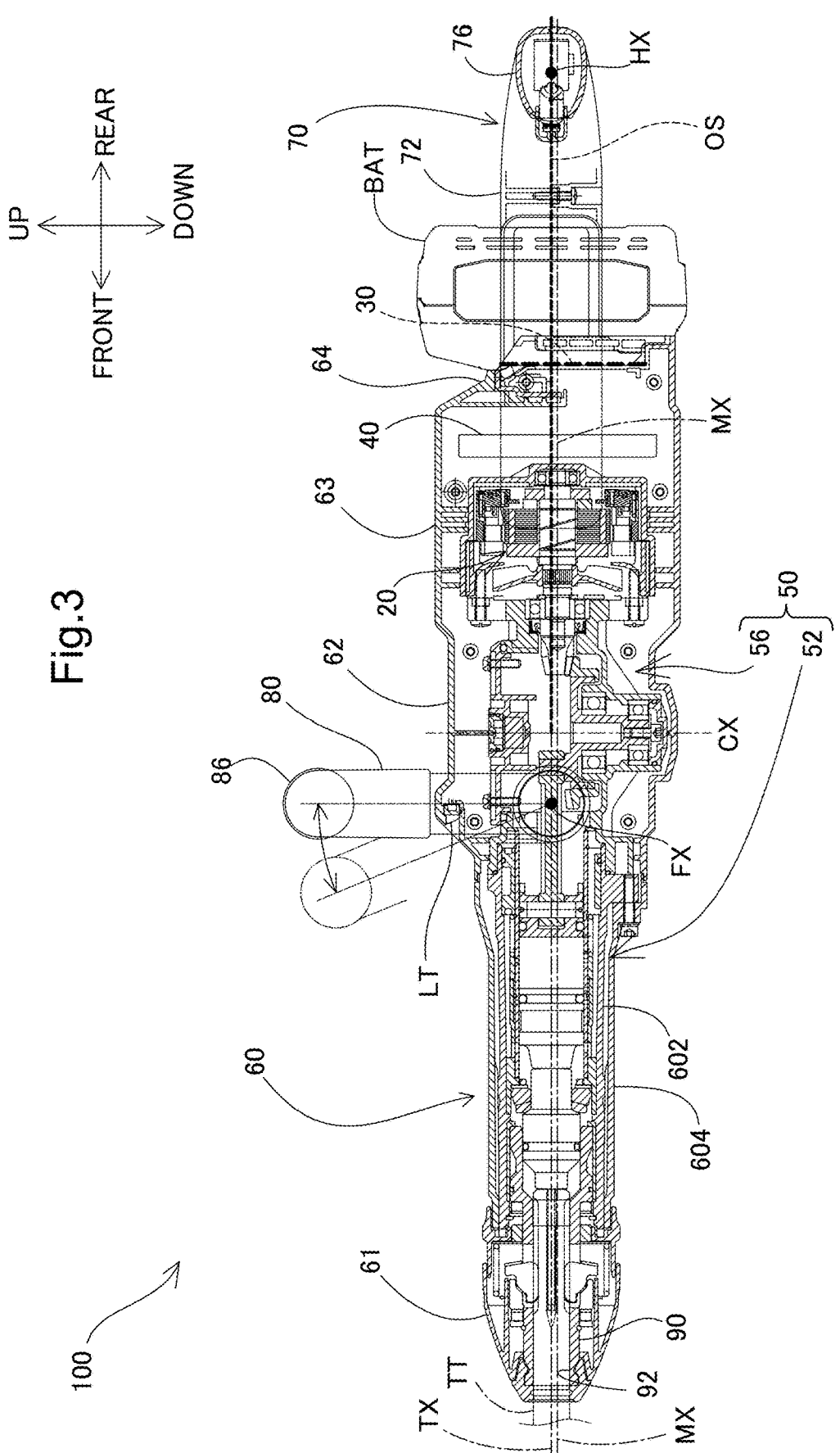
FIG. 3 is a sectional view taken along line III-III in FIG. 2.
Figure 5:
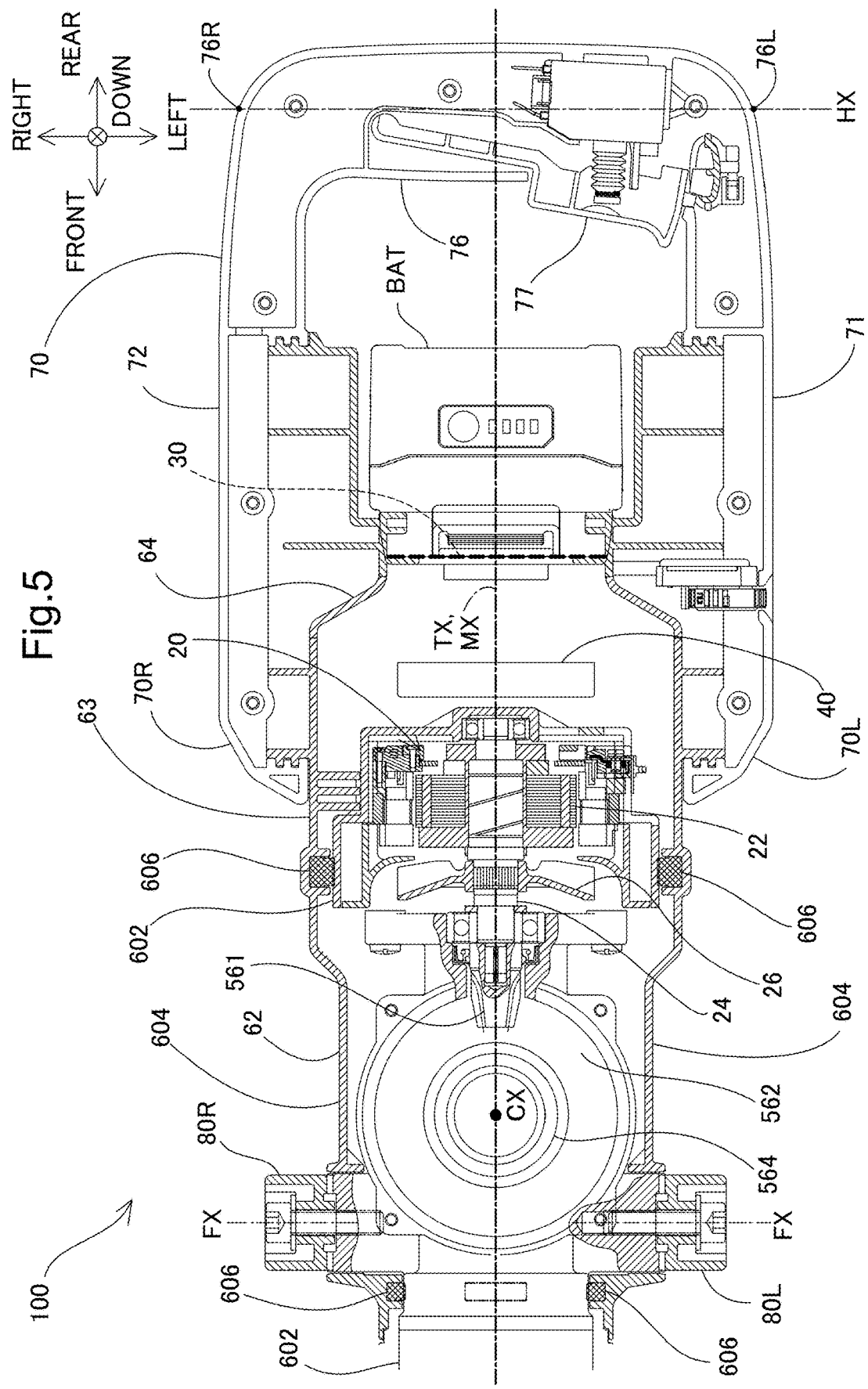
FIG. 5 is a sectional view showing a part taken along line V-V in FIG. 1.

The grip part 76 is a part of the main handle 70 that is configured to be held by a user. The grip part 76 has a generally circular cylindrical shape. The extending direction of the grip part 76 can be defined, for example, by a direction of a center axis HX of the grip part 76. As shown in FIGS. 3 and 5, the extending direction of the grip part 76 is, for example, parallel to a plane OS orthogonal to the rotational axis CX of a second bevel gear 562 and is orthogonal to the hammer axis TX. In this embodiment, the extending direction of the grip part 76 is coincident with the left-right direction. With such configuration, the grip position of the main handle 70 and the positions of gravity of the second bevel gear 562 and the crank shaft 564 are arranged such that the power tool 100 has a good weight balance in the left-right direction. In another embodiment, the extending direction of the grip part 76 may be a direction crossing at a prescribed angle to the hammer axis TX, provided that, for example, it is parallel to the plane OS. An intersection of the center axis HX of the grip part 76 and a left outer peripheral surface of the grip part 76 is referred to as a first end 76L of the grip part 76, and an intersection of the center axis HX and a right outer peripheral surface of the grip part 76 is referred to as a second end 76R of the grip part 76. The first extension part 71 is a part of the main handle 70 that connects the first connection part 70L and the first end 76L of the grip part 76. The second extension part 72 is a part of the main handle 70 that connects the second connection part 70R and the second end 76R of the grip part 76.

As shown in FIG. 3, the grip part 76 of the main handle 70 is arranged rearward of the rotational axis CX of the second bevel gear 562 and rearward of the housing 60. Further, the hammer axis TX passes through between the first end 76L and the second end 76R of the grip part 76, when the power tool 100 is viewed in a direction orthogonal to the hammer axis TX (more specifically, viewed from above in the up-down direction shown in FIG. 5). In this embodiment, the hammer axis TX passes through the grip part 76. In the example shown in FIG. 3, the hammer axis TX crosses the center axis HX of the grip part 76. With the arrangement of the extending direction of the main handle 70 along the hammer axis TX, a user can easily push the tool accessory TT along the hammer axis TX by pressing the rear end of the main handle 70. Further, with the arrangement of the grip part 76 on the hammer axis TX, a user can more easily push the tool accessory TT along the hammer axis TX by pressing the rear end of the main handle 70. Therefore, the power tool 100 is suitable for digging work. The hammer axis TX may not be orthogonal to the extending direction of the grip part 76, for example, but it may cross at a prescribed angle to the extending direction of the grip part 76 in an area between the first end 76L and the second end 76R of the grip part 76. The grip part 76 may be offset upward or downward relative to the hammer axis TX, or it may be offset upward or downward relative to the plane OS.

The plane OS orthogonal to the rotational axis CX of the second bevel gear 562 passes through the grip part 76 and the first and second connection parts 70L, 70R. In other words, the main handle 70 is configured to extend rearward along the plane OS from the housing 60. In the example shown in FIG. 1, the first extension part 71 extends rearward from the first connection part 70L, and the second extension part 72 extends rearward from the second connection part 70R. With such configuration of the power tool 100, a user can easily apply a force along the plane OS by using the main handle 70, so that the power tool 100 is suitable for digging work. In this embodiment, the plane OS contains the center axis HX of the grip part 76.

As shown in FIG. 1, the front handle 80 is generally U-shaped, and has a grip part 86 configured to be held by a user, and connection parts 80L, 80R. The grip part 86 has a generally circular cylindrical shape extending in the left-right direction, and is arranged above the housing 60. The front handle 80 is connected at both ends to the housing 60 via the connection parts 80L, 80R. In this embodiment, the connection parts 80L, 80R support the front handle 80 in such a manner as to allow adjustment of the position of the front handle 80 around a support axis FX relative to the housing 60. The front handle 80 is not, however, limited to that of such position adjustable type, but it may be immovably fixed to the housing 60. For example, the front handle 80 may be mounted upside down relative to the mounted state shown in FIG. 1. In this case, the grip part 86 is located below the housing 60. Further, for example, the front handle 80 may be configured to be detachable from the housing 60. In this case, the front handle 80 may be configured to be freely changed in position to either the position above the housing 60 or the position below the housing 60, if desired.

Figure 4:
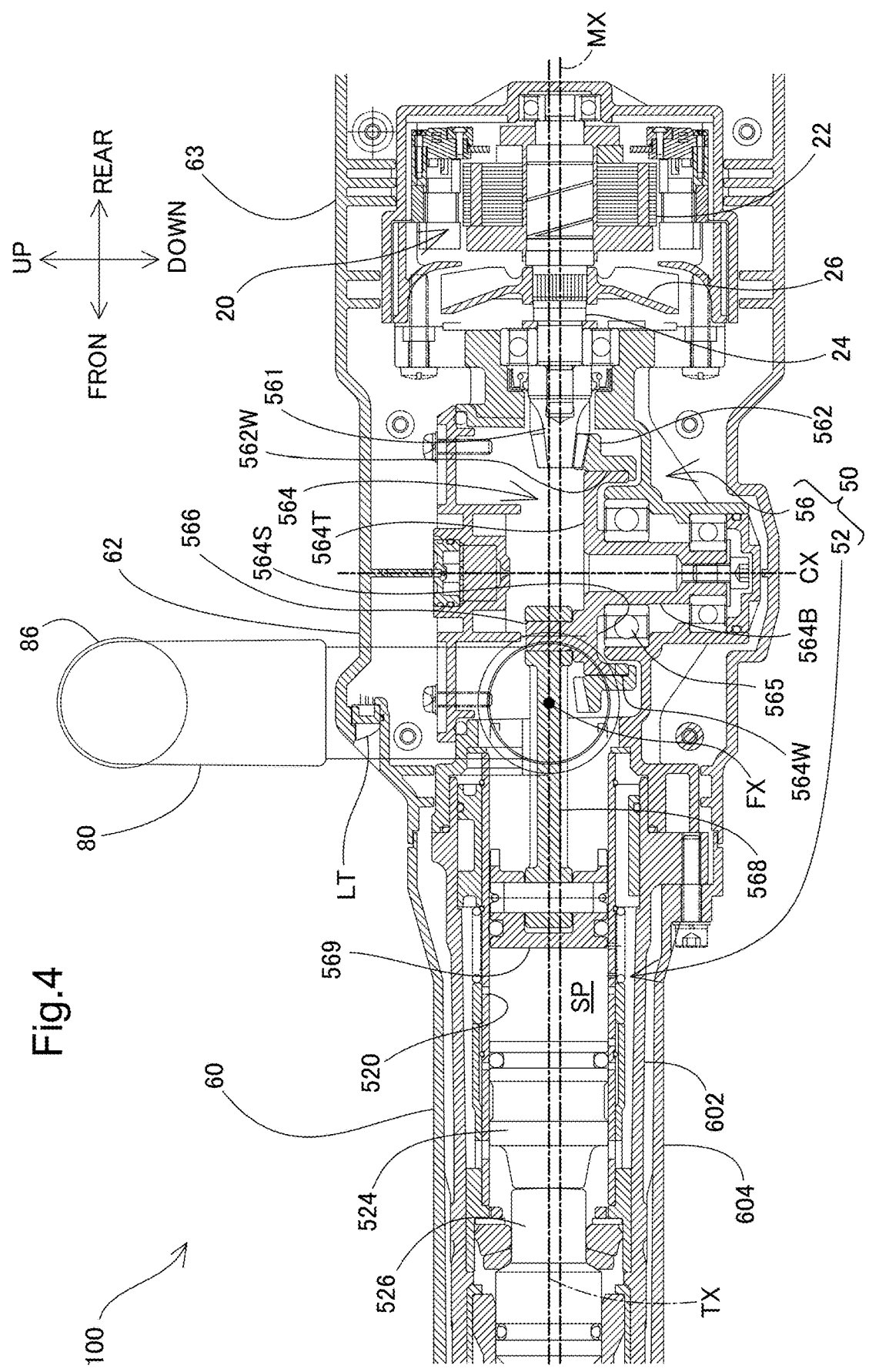
FIG. 4 shows the configuration of a hammer mechanism.

The connection parts 80L, 80R are connected to the housing 60 at a position slightly forward of the center of the housing 60 in the front-rear direction. Specifically, as shown in FIG. 4, the front handle 80 is connected to the housing 60 at a position forward of the rotational axis CX of the second bevel gear 562. With this arrangement, a user can easily transmit to the power tool 100 a force of pressing the tool accessory TT against a work object by using the front handle 80, so that the power tool 100 is suitable for digging work.

In this embodiment, the support axis FX of the front handle 80 orthogonal to the hammer axis TX. When pushing the housing 60 forward by using the front handle 80, a user transmits the force to the housing 60 via the support axis FX by operating the front handle 80. With such configuration of the power tool 100 of this embodiment, a user can easily push the housing 60 forward along the hammer axis TX, so that the power tool 100 is suitable for digging work.

As shown in FIG. 1, a switch trigger 77 is provided on the grip part 76 of the main handle 70. The switch trigger 77 is a so-called momentary switch. When, for example, a user depresses the switch trigger 77 while holding the grip part 76, the motor 20 is driven and the power tool 100 is turned on.

The switch trigger 77 is arranged in a position facing the rear end part 64 of the housing 60 on the grip part 76. When using the power tool 100, for example, a user holds the grip part 76 of the main handle 70 with one hand, while holding the grip part 86 of the front handle 80 with the other hand. The user can perform digging of a work object such as the ground by pushing the power tool 100 forward by using the main handle 70 while pressing the tool accessory TT against the work object. The user can start and stop hammering motion at any time during digging work by switching on and off the switch trigger 77 while operating the main handle 70. Further, the user can suitably perform the action of scooping up with the power tool 100, by using the front handle 80. Thus, the power tool 100 is suitable for digging work.

A light emitting part LT is provided on the housing 60. The light emitting part LT is, for example, an LED light using a battery BAT as a power source. The light emitting part LT is configured to emit light toward (illuminate) the tool accessory TT or a working area including a work object or its surroundings. The visibility of the working area of the power tool 100 is improved by providing the light emitting part LT. In this embodiment, the light emitting part LT is arranged in a position surrounded by the front handle 80, so that the light emitting part LT is protected from impact by utilizing the front handle 80.

The battery BAT for supplying power to the motor 20 is arranged on the rear end part 64 of the housing 60. In this disclosure, a rechargeable battery having a known structure is used as the battery BAT.

Figure 2:
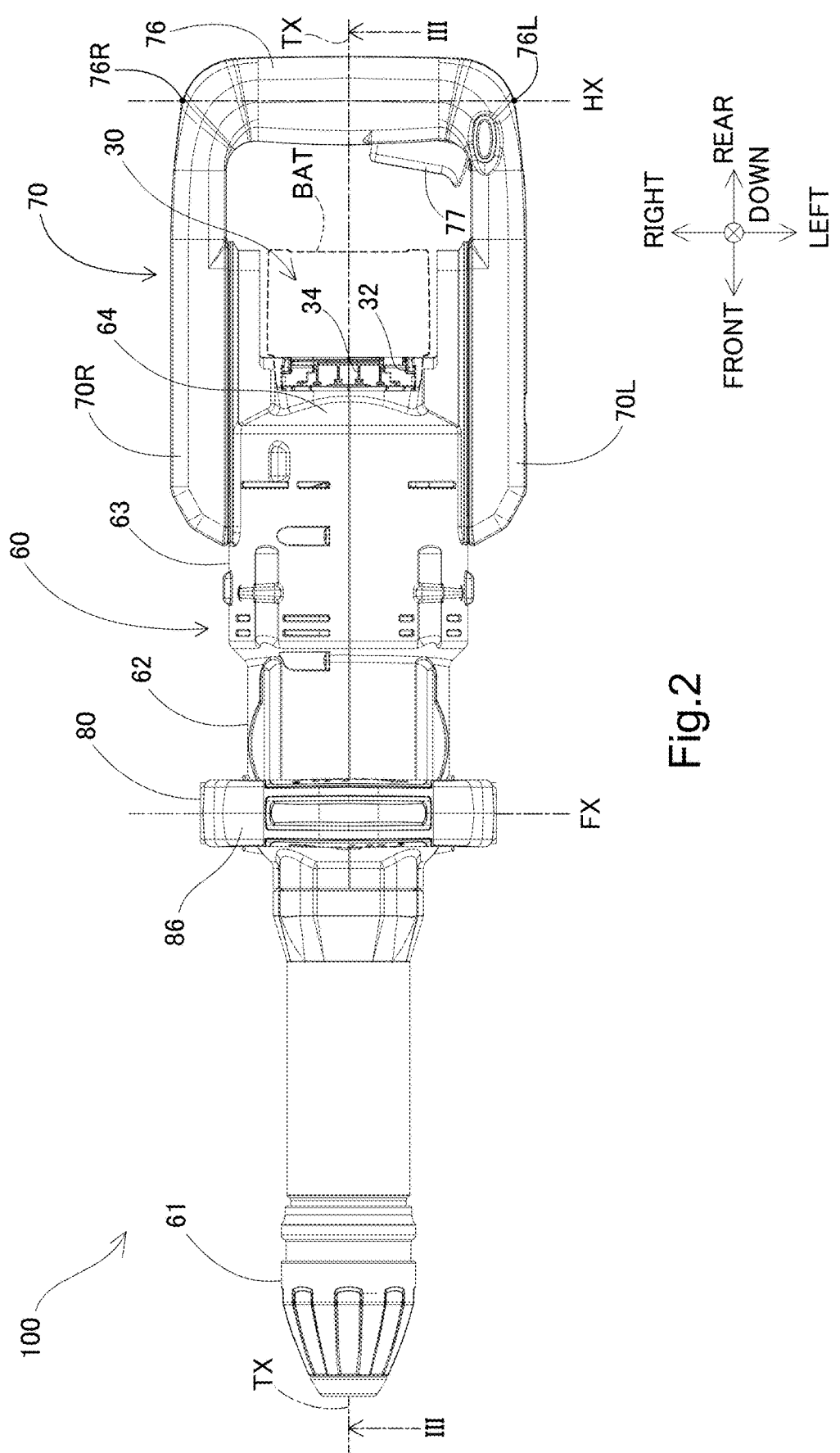
FIG. 2 shows the configuration of a battery mounting part.

FIG. 2 shows the power tool 100 in a state that the battery BAT is detached therefrom. As shown in FIG. 2, a battery mounting part 30 for mounting the battery BAT is provided on the rear end part 64 of the housing 60. In FIG. 2, the position of the battery BAT attached to the battery mounting part 30 is shown by a broken line for easy technical understanding.

The battery mounting part 30 has guide rails 32 and terminals 34. The battery mounting part 30 may further have a locking mechanism for restricting falling of the battery BAT. The guide rails 32 are formed as projections that extend in the up-down direction. The guide rails 32 are configured to be respectively fitted in recessed rail receiving parts (not shown) of the battery BAT. The guide rails 32 define an attaching/detaching direction DB in which the battery BAT shown in FIG. 1 is attached and detached. The battery BAT attached to the battery mounting part 30 is electrically connected via the terminals 34 and can supply power to the motor 20.

The attaching/detaching direction DB of the battery BAT is set to a direction crossing the center axis HX, which is the center axis of the grip part 76, provided that the battery BAT does not interfere with the main handle 70. In the example shown in FIG. 2, the attaching/detaching direction DB is orthogonal to the hammer axis TX. Thus, the attaching/detaching direction DB coincides with the up-down direction and is orthogonal to the center axis HX. A user can detach the battery BAT from the battery mounting part 30 by pulling out the battery BAT upward along the attaching/detaching direction DB. Further, the user can attach the battery BAT to the battery mounting part 30 by pushing in the battery BAT downward along the attaching/detaching direction DB. The user can attach and detach the battery BAT in the direction crossing the center axis HX of the grip part 76 in this manner, so that the user can easily attach and detach the battery BAT by one hand, even while holding the main handle 70 or the front handle 80 by the other hand. In another embodiment, the attaching/detaching direction DB of the battery BAT may be set to a direction obliquely crossing the hammer axis TX, provided that the battery BAT does not interfere with the main handle 70. The battery BAT may be detached by pulling out downward along the attaching/detaching direction DB, and attached by pushing in upward.

As shown in FIG. 2, the battery mounting part 30 is arranged between both ends of the main handle 70 on the rear end part 64 of the housing 60. In the example shown in FIG. 2, the battery mounting part 30 is arranged between the first and second connection parts 70L, 70R in the extending direction of the grip part 76. By such arrangement that the battery BAT attached to the battery mounting part 30 is surrounded by the main handle 70, the battery BAT is protected by utilizing the main handle 70. For example, the battery BAT is protected from impact when the power tool 100 is dropped.

As shown in FIG. 3, the battery mounting part 30 is configured such that the hammer axis TX passes through the battery mounting part 30. In this embodiment, the battery mounting part 30 is arranged on a rear surface of the housing 60. With the arrangement of the battery BAT on the hammer axis TX, the size increase of the housing 60 in a radial direction crossing the hammer axis TX is reduced or prevented.

The structures of elements disposed within the housing 60 are now described with reference to FIGS. 3 to 5. In this embodiment, as shown in FIG. 3, the housing 60 includes an inner housing 602 and an outer housing 604. The outer housing 604 houses the inner housing 602 and forms an outer shell of the housing 60. The main handle 70 and the front handle 80 are connected to the outer housing 604. The inner housing 602 houses the motor 20, a controller 40, a hammer mechanism 50 and a tool holder 90. The tool holder 90 detachably holds the tool accessory TT in an insertion hole 92 formed in the front end part 61 of the housing 60.

The motor 20 is driven by power supplied from the battery BAT attached to the battery mounting part 30. The motor 20 is a brushless DC motor that is driven under control of the controller 40. As shown in FIG. 3, the motor 20 is housed in the motor housing part 63 behind the hammer mechanism housing part 62 within the housing 60, such that the hammer axis TX passes through the motor 20. The motor axis MX of the motor 20 is arranged relatively close to the hammer axis TX, so that the power tool 100 can be reduced in size in the radial direction.

As shown in FIG. 4, the motor 20 has a motor body 22 including a stator and a rotor, a motor shaft 24 and a fan 26. The motor body 22 is arranged in the inner housing 602 within the motor housing part 63. The motor shaft 24 rotates around the motor axis MX together with the rotor. A front end of the motor shaft 24 protrudes into the hammer mechanism housing part 62. A first bevel gear 561 is provided on the front end of the motor shaft 24. The fan 26 rotates together with the motor shaft 24 and generates air flow for cooling the motor body 22.

As shown in FIG. 3, the controller 40 is formed by a computer including a CPU as a processor and memories such as a RAM and a ROM. The controller 40 is configured to control driving of the motor 20 and other various operations in the power tool 100. The controller 40 is arranged between the motor 20 and the grip part 76 of the main handle 70 in the front-rear direction. The controller 40 is arranged within the housing 60 such that its surface direction crosses the motor axis MX. The controller 40 is housed within a rear part of the housing 60 in which a space can be easily formed, so that the controller 40 is efficiently arranged within the housing 60. In this embodiment, the controller 40 is arranged in the rear end part 64 behind the motor housing part 63 within the housing 60 and between the motor 20 and the battery mounting part 30. Further, the controller 40 is arranged such that the hammer axis TX passes through the controller 40. With such configuration, the housing 60 can be reduced in size in the radial direction.

As shown in FIG. 4, the hammer mechanism 50 includes a hammer (striking) part 52 and a crank part 56. The crank part 56 is configured to convert rotary motion of the motor shaft 24 into linear motion of a hammer (strike) element 524 along the hammer axis TX and transmits the kinetic energy of the rotary motion of the motor shaft 24 to the hammer element 524. The hammer part 52 transmits the kinetic energy of the hammer element 524 from the crank part 56 to the tool accessory TT.

The crank part 56 includes the first bevel gear 561, the second bevel gear 562, the crank shaft 564, a rod 568 and a piston 569. The first bevel gear 561 is provided on the front end of the motor shaft 24 and engaged with the second bevel gear 562 within the hammer mechanism housing part 62. The crank shaft 564 includes a body part 564B, a crank plate 564T and a peripheral part 564W. The peripheral part 564W is a part of the crank shaft 564 that is continuous to the crank plate 564T around the rotational axis CX.

The second bevel gear 562 is provided on an outer periphery of the crank shaft 564. The second bevel gear 562 is integrally formed with the crank shaft 564. In this embodiment, the second bevel gear 562 is separately formed from the crank shaft 564, and an inner peripheral surface 562W of the second bevel gear 562 is secured to the peripheral part 564W of the crank shaft 564, for example, by press fitting, so that a single component part having a function of the crank shaft 564 and a function of the second bevel gear 562 is formed. The driving force of the motor 20 is efficiently transmitted via the crank shaft 564 and the second bevel gear 562. The crank shaft 564 is rotatably supported relative to the inner housing 602 by a bearing 565 and rotates together with the second bevel gear 562 around the rotational axis CX. Thus, a rotational axis of the second bevel gear 562 coincides with the rotational axis CX of the crank shaft 564. The rotational axis CX is orthogonal to the motor axis MX and the hammer axis TX. A space 564S for arranging the bearing 565 is defined between the peripheral part 564W and the body part 564B under the crank plate 564T. By arranging the bearing 565 in the space 564S, the crank shaft 564, the bearing 565 and the second bevel gear 562 are arranged side by side in a radial direction of the crank shaft 564. With this arrangement, the size of the arrangement region of the crank shaft 564, the bearing 565 and the second bevel gear 562 can be reduced in the axial direction of the rotational axis CX. The second bevel gear 562 may be integrally formed with the crank shaft 564, for example, by molding.

Rotation of the motor shaft 24 is transmitted to the second bevel gear 562 and the crank shaft 564 via the first bevel gear 561. The second bevel gear 562 and the crank shaft 564 are rotated around the rotational axis CX orthogonal to the motor axis MX by rotation of the first bevel gear 561.

The crank shaft 564 transmits the kinetic energy from the motor 20 to the hammer part 52. A crank pin 566 is provided on the crank plate 564T of the crank shaft 564. A rod 568 is mounted onto the crank pin 566 and connects the crank pin 566 and the piston 569.

The crank pin 566 is offset from the rotational axis CX. When the crank shaft 564 rotates, the crank pin 566 rotates around the rotational axis CX. The rod 568 is oscillated in the front-rear direction perpendicular to the rotational axis CX by rotation of the crank shaft 564. Rotary motion of the crank shaft 564 is transmitted to the piston 569 via the rod 568.

The piston 569 is a generally cylindrical member. The piston 569 is arranged to be slidable along the hammer axis TX within a cylinder 520 formed in the inner housing 602. The piston 569 is configured to be reciprocated in the front-rear direction via the rod 568 along with rotation of the crank pin 566.

The hammer part 52 includes the hammer element 524 and an impact bolt 526. The hammer element 524 applies a hammering force to the tool accessory TT. The hammer element 524 is arranged to be slidable along the hammer axis TX within the cylinder 520. An air chamber SP that functions as an air spring is defined between the piston 569 and the hammer element 524 within the cylinder 520. The impact bolt 526 is an intermediate element that transmits the kinetic energy of the hammer element 524 to the tool accessory TT. The impact bolt 526 is arranged in front of the hammer element 524 so as to be movable along the hammer axis TX.

When the piston 569 is reciprocated in the front-rear direction, the pressure within the air chamber SP fluctuates and the hammer element 524 is slid in the front-rear direction within the cylinder 520 by the action of the air spring. More specifically, when the piston 569 is moved forward, the distance between the piston 569 and the hammer element 524 decreases, so that air within the air chamber SP is compressed and the pressure within the cylinder 520 increases. The hammer element 524 is pushed forward at high speed and hammers (strikes, hits) the impact bolt 526 by the action of the air spring.

The hammered impact bolt 526 transmits the kinetic energy of the hammer element 524 to the tool accessory TT. The tool accessory TT is then linearly driven along the hammer axis TX. In the power tool 100 of this embodiment, utilizing the action of the air spring, vibration of the power tool 100 is reduced and larger kinetic energy is transmitted to the tool accessory TT, compared with a power tool in which the kinetic energy is mechanically transmitted to the tool accessory TT.

When the piston 569 is moved rearward, the distance between the piston 569 and the hammer element 524 increases, so that air within the air chamber SP is expanded. Thus, the pressure within the cylinder 520 decreases and the hammer element 524 is retracted rearward. The hammered tool accessory TT comes into contact with a work object and moved rearward together with the impact bolt 526 by a reaction force from the work object. Similar hammering motion of the hammer mechanism 50 is repeated.

As shown in FIG. 4, the power tool 100 of this embodiment is configured such that the motor axis MX is arranged close to the hammer axis TX. For this purpose, the motor axis MX is arranged to pass through the inside of the cylinder 520. In the example shown in FIG. 4, the motor axis MX of the motor shaft 24 is arranged slightly below the hammer axis TX and in parallel to the hammer axis TX. Components from the motor 20, which is a driving source of the kinetic energy, to the tool accessory TT are arranged substantially on a straight line by arranging the motor axis MX and the hammer axis TX close to each other, so that the hammer axis TX is arranged close to the center of gravity of the whole power tool 100. This improves the power tool 100 in operability. In another embodiment, the motor axis MX may coincide with the hammer axis TX. Alternatively, the motor axis MX may be arranged close to the hammer axis TX and above or on the left or right side of the hammer axis TX. Even with such configuration, the power tool 100 is improved in operability by arranging the hammer axis TX close to the center of gravity of the whole power tool 100.

As shown in FIG. 5, in this embodiment, elastic elements 606 are provided between the inner housing 602 and the outer housing 604. Each of the elastic elements 606 are a resin material such as urethane and silicon. The elastic elements 606 have, for example, a generally cubic shape. The elastic elements 606 are held in contact with the inner housing 602 and the outer housing 604. In the example shown in FIG. 5, the housing 60 has four elastic elements 606. Specifically, two of the elastic elements 606 are arranged on the front and side of the rotational axis CX, and the other two are on the rear side of the rotational axis CX in the front-rear direction of the housing 60. The two elastic elements 606 on the front side are arranged on the left and right sides of the hammer axis TX. Similarly, the two elastic elements 606 on the rear side ore arranged on the left and right sides of the hammer axis TX.

Provision of the elastic elements 606 between the inner housing 602 and the outer housing 604 reduces transmission of vibration from the inner housing 602 that is a vibration source to the outer housing 604 during hammering motion. Further, this provision also reduces or prevents backlash between the inner housing 602 and the outer housing 604 due to dimensional errors of the inner housing 602 and the outer housing 604 in manufacturing. Any number (one or two or more) of elastic elements 606 may be provided. The elastic elements 606 is not limited to a resin material, but it may be a metal material such as a metal spring. The shape of the elastic elements 606 is not limited to a cubic shape, but may be any shape such as a rectangular parallelepiped shape, a spherical shape and a columnar shape. The elastic elements 606 may be an annular member such as an O-ring that is arranged continuously around the periphery of the inner housing 602.

B. Other Embodiments (B1) The above-described embodiment is described using a shovel as an example of the tool accessory TT, but the tool accessory TT may be a tool other than a shovel. The tool accessory TT may also be a tool such as a so-called spatula or a scraper that is used for peeling work on a work object. In peeling work, like digging work, the power tool 100 can be pressed against a work object, so that the power tool 100 of the above-described embodiment is also suitable for peeling work. The tool accessory TT may also be a tool such as a needlegun scaler, a needle scaler and a needlegun for peeling rust or coating from a surface of a work object by a plurality of needle-like members being pressed against the work object while being reciprocated back and forth. The shovel may be either standardized or non-standardized by the Japanese Industrial Standard (JIS). The shovel may have a part on which a user's foot can be placed.

(B2) In view of the nature of the present disclosure and the above-described embodiments, the following aspects are provided. The aspects can be employed in combination with the power tool 100 of the above-described embodiments, the above-described modifications or the claimed invention.

(Aspect 1) The hammer axis passes through the motor.

(Aspect 2) The front handle is supported to be adjustable in position relative to the housing, and a support axis of the front handle is orthogonal to the hammer axis.

(Aspect 3) The hammer axis passes through the controller.

(Aspect 4) The controller is arranged rearward of the motor in the housing.

(Aspect 5) The controller is arranged between the motor and the battery mounting part.

DESCRIPTION OF THE REFERENCE NUMERALS

20: motor, 22: motor body, 24: motor shaft, 26: fan, 30: battery mounting part, 32: guide rail, 34: terminal, 40: controller, 50: hammer mechanism, 52: hammer part, 56: crank part, 60: housing, 61: front end part, 62: hammer mechanism housing part, 63: motor housing part, 64: rear end part, 70: main handle, 70L: first connection part, 70R: second connection part, 71: first extension part, 72: second extension part, 76: grip part, 77: switch trigger, 80: front handle, 80L, 80R: connection part, 86: grip part, 90: tool holder, 92: insertion hole, 100: power tool having a hammer mechanism, 520: cylinder, 524: hammer element, 526: impact bolt, 561: first bevel gear, 562: second bevel gear, 562W: inner peripheral surface, 564: crank shaft, 564B: body part, 564T: crank plate, 564W: peripheral part, 565: bearing, 566: crank pin, 568: rod, 569: piston, 602: inner hosing, 604: outer housing, 606: elastic element, BAT: battery, LT: light emitting part, SP: air chamber, TT: tool accessory

The invention claimed is:

1. A power tool, comprising:
a motor having a motor shaft that rotates around a motor axis;
a hammer mechanism that includes a cylinder and a hammer element adjacent to an air chamber defined within the cylinder and is configured to convert rotary motion of the motor shaft to linear motion of the hammer element along a prescribed hammer axis by utilizing action of an air spring of the air chamber;
a housing that houses the motor and the hammer mechanism,
wherein the motor axis is parallel to the hammer axis and to pass through an inside of the cylinder; and
a main handle that includes (i) a grip part configured to be held by a user, (ii) a first connection part that connects a first end of the grip part to the housing, and (iii) a second connection part that connects a second end of the grip part to the housing, wherein:
the hammer axis passes through between the first end and the second end of the grip part when the power tool is viewed in a direction orthogonal to the hammer axis,
the hammer mechanism further includes (i) a second bevel gear that is engaged with a first bevel gear provided on the motor shaft, and (ii) a crank shaft that rotates together with the second bevel gear, and
an extending direction of the grip part is (i) parallel to a plane orthogonal to a rotational axis of the second bevel gear and (ii) crosses the hammer axis.

2. The power tool as defined in claim 1, comprising:
a controller that controls the motor,
wherein:
the main handle is connected to a rear end part of the housing, and
the controller is (i) housed in the housing and (ii) arranged between the motor and the grip part in an extending direction of the hammer axis.

3. The power tool as defined in claim 2, wherein the hammer axis passes through the controller.

4. The power tool as defined in claim 2, wherein the controller is arranged rearward of the motor in the housing.

5. The power tool as defined in claim 2, wherein:
the housing further includes a battery mounting part to which a battery for supplying power to the motor is removably attachable, and
the controller is arranged between the motor and the battery mounting part.

6. The power tool as defined in claim 1, wherein:
the housing further includes a battery mounting part to which a battery for supplying power to the motor is removably attachable, and
the hammer axis is arranged to pass through the battery mounting part.

7. The power tool as defined in claim 6,
wherein the battery mounting part is arranged between the first connection part and the second connection part on the housing in the extending direction of the grip part.

8. The power tool as defined in claim 1,
wherein:
the housing includes an inner housing that houses the motor and the hammer mechanism, and an outer housing that houses the inner housing,
the main handle is connected to the outer housing, and
an elastic element is arranged in contact with the inner housing and the outer housing between the inner housing and the outer housing.

9. The power tool as defined in claim 1, further comprising:
a front handle configured to be held by the user,
wherein:
when an extending direction of the hammer axis defines a front-rear direction of the power tool,
the main handle is connected to the housing at a location rearward of the rotational axis of the second bevel gear, and
the front handle is connected to the housing at a location forward of the rotational axis of the second bevel gear.

10. The power tool as defined in claim 1, further comprising a light emitting part that is configured to emit light toward a working area.

11. The power tool as defined in claim 1, wherein the hammer axis passes through the motor.

12. The power tool as defined in claim 1, further comprising:

a front handle configured to be held by the user, wherein:

the front handle is supported to be adjustable in position relative to the housing, and a support axis of the front handle is orthogonal to the hammer axis.

\* \* \* \* \*